Aug. 22, 1967   F. L. BOYS   3,336,792
METHOD OF ANALYZING SOIL GASES
Filed Jan. 31, 1964
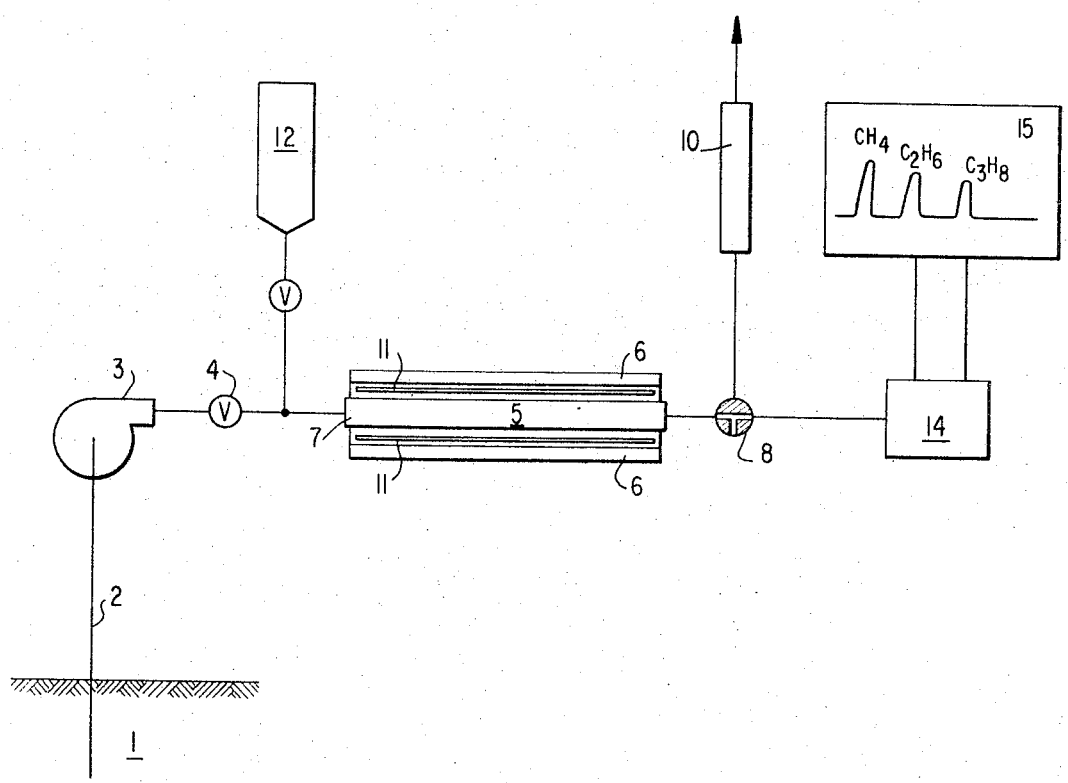
INVENTOR.
FAY L. BOYS
BY
McLean & Boustead
ATTORNEYS 3,336,792
METHOD OF ANALYZING SOIL GASES
Fay L. Boys, Peotone, Ill., assignor to Sinclair Research, Inc., New York, N.Y., a corporation of Delaware
Filed Jan. 31, 1964, Ser. No. 341,655
3 Claims. (Cl. 73—23.1)

This invention relates to a method for analyzing soils for the presence of low molecular weight hydrocarbon materials.

It is known that deep-seated petroleum and/or natural gas deposits are often associated with hydrocarbon gases present in small quantities in the surface soil near the deposits. The analysis of soil for these hyrocarbon gases is a method of determining location of oil and gas deposits.

The method of this invention makes it possible to analyze soil gases for extremely small quantities of hydrocarbon gas in the field in a short testing time. The apparatus may comprise a means for passing a suitable amount of soil gas through a refrigerated, gas chromatography column, a means for recording the volume of gas flow through the column, a means for heating the column, a means for analyzing gas eluted from the column and a means for recording the output of the detector. If desired, the apparatus can be constructed by modification of commercially available gas chromatography units.

The method of this invention involves passing a sample of soil gas through a refrigerated gas chromatography column to trap the desired gases at the head or inlet end of the column. The sample gas is passed through the column for a time and is measured by a flow indicator to indicate volume of flow. At the end of the sampling period, carirer gas is passed through the column, entering at the head where the sample has been trapped. The column is heated, say to about 180 to 250° C. and the hydrocarbon components of the sample gas in the column are separated and passed to the detector where concentrations are measured and recorded.

The column heating method may be either programmed temperature chromatography or thermochromatography. In programmed temperature chromatography the entire column is heated from the initial temperature to progressively higher temperatures in order to progressively elute the various adsorbed components. In thermochromatography a temperature gradient is established along a portion of the column. The heating causes the various components to elute. Elution is maintained by moving the temperature gradient along the column.

The process of this invention will be more fully described by reference to the drawing. A surface soil 1 is probed with a conduit 2 which allows soil gas to escape from the soil. A pump 3 is used to draw the gas from the soil. The soil gas is passed through a valve 4 into the column 5 which is provided with a refrigerator means 6. The hydrocarbon components of the sample gas are trapped at the head of the column 7, cooled by refrigerating means 6, while other soil gases such as oxygen, nitrogen, hydrogen, etc. pass through the column through threeway valve and pass to flow meter 10. When the column has trapped a detectable quantity of hydrocarbon gas, the flow of soil gas is discontinued and the column is heated by heater 11. A carrier gas, e.g. nitrogen, from reservoir 12 is admitted to the column through valve 13. The carrier gas and hydrocarbon eluted from the initial portion of column 5 are passed through the column and valve 8 to detector 14 wherein the amount and character of hydrocarbon gases are detected. Detector 14 may be connected with recorder 15 which gives a permanent record of the gas and quantity of hydrocarbon gas.

The probe 2 used to conduct the gas sample from the soil to the column can be any suitable means such as a metal pipe or synthetic resin tubing. A gas pump 3 may be desirable in order to collect the sample in a shorter amount of time.

The column 7 used can be a conventional gas chromatography column. The principles and techniques of gas chromatography are well known. They involve the passage of a known quantity of a gas to be analyzed into a carrier stream of gas of known composition, which carrier stream carries the mixture to be analyzed into a chromatographic column. The column may contain an adsorbant usually in granular form in order to separate the various components of the fluid sample. Under proper operating conditions, the adsorbent selectively adsorbs and desorbs the various components of the flow sample so that they are spatially separated as they move through the column. Suitable adsorbent packings are activated carbon, alumina and silica gel. An especially good adsorbent for use in the process of this invention is a molecular sieve having a pore diameter of about 5 A. Aluminosilicate molecular sieve type adsorbents having a pore diameter of about 5 A. are known and are employed on a commercial scale, for example, the Linde 5A molecular sieve. Gas-liquid partition chromatography wherein a gas sample is continuously dissolved and evaporated as it passes along the column in contact with the liquid may also be used in this invention. In this process, lighter components of the gas sample appear at the column exit in advance of the heavier components. The liquid partitioning agents are disposed on an inert carrier such as diatomaceous earth, ceramic bed or ceramic discs. Suitable liquids for use in this invention include mineral oil, dioctyl phthalate, silicone fluids, tricresyl phosphate, dibutyl phthalate and the like.

In order to trap hydrocarbon gases in the partitioning media at the head of the column, the temperature of the column must be extremely low. Any suitable refrigeration system can be utilized, for example, a heat exchanger which will carry a refrigerant may be placed in contact with the column. The column can be simply placed in a low temperature bath such as Dry Ice or a bath of Dry Ice in acetone. When a molecular sieve partioning medium is used, for example, the temperature should be approximately that of Dry Ice in order to trap all hydrocarbon gases.

The column must also be provided with a heating means. Thermoelectric heating and cooling devices may be developed that will be suitable for both heating and cooling. The heating means may be a heat exchanger through which heating liquid passes. However, the preferred heating means is an electrical heating element. The heater may be a condenser or a coil for induction heating or resistive heating where the column serves as the heating element. In the case of thermochromatography, mechanical means may be provided for moving the heating element along the axis of the column. The column may be constructed of a non-metal such as a ceramic glass tube, if the heater is a condenser. A metal column may be used and is preferred when the heating means is a coil.

The gases eluted from the column pass into a detector such as an ionization detector or a thermal conductivity cell. The output of the detector may be coupled to a conventional recorder, such as a strip chart recorder.

A measurement of the sample size is desirable in order to determine the percentage of the hydrocarbon gas present in the soil gas. Sample size is determined by conducting the sample gas through a flow measuring device as the gas leaves the column during the sampling period. The flow measuring device may be a differential pressure gauge, a float-type flow meter or the like. Hydrocarbon ratios may, however, be determined even without knowing sample volume.

The process for determining the amount and/or the identity of hydrocarbons in soil gas comprises first obtaining a sample of soil gas; second, passing the sample gas through a cold gas chromatography column and simultaneously trapping the hydrocarbon gases at the head of the column and finally analyzing the trapped hydrocarbon gases as by programmed temperature gas chromatography. The sample gas may be withdrawn from the soil through a conduit driven into the soil, from an existing well, from a well being bored, etc. Any suitable means of obtaining a representative sample may be used. A gas pump may be required to carry the gas sample to the column and another pump at the outlet of the column may also be used. The temperature of the column during the trapping of the hydrocarbons should be maintained at a temperature low enough so that substantially all of the hydrocarbon gases are trapped at the head of the column. This temperature may vary depending upon the type of partition or adsorption medium employed. Generally, the temperature should be in the range of about −40° C. to −200° C. and a temperature of about −50° C. to about −80° C. is preferred. The sample time will depend to some extent upon the amount of hydrocarbon material in the soil gas. For example, if a large percentage of the sample gas is hydrocarbon, only a short time will be required to trap enough hydrocarbon for optimum detection. Long sample times should be avoided in such a case to prevent overloading the column, or broadening of the trapped sample zone. Under normal situations, the gas sample contains only very small traces of hydrocarbon gas. In such a case, it is necessary to take a sample for a sufficient time so that the amount of hydrocarbon trapped is large enough to be detected. In the case of a thermal conductivity cell, the size of the hydrocarbon sample may be at least about 2 microliters, whereas in the case of an ionization detector, 0.01 microliter of hydrocarbon gas can be detected. With a normal sample of soil gas about ½ to 10 minutes are suitable to trap a detectable amount of hydrocarbon gas. Before heating the column, a carrier gas such as helium, hydrogen, nitrogen, oxygen, etc. is passed through the column, entering at the head where the sample has been trapped. A programmed temperature analysis using conventional techniques is then conducted. Generally, the final column temperature should be in the range of about 180° to 250° C. The analysis may require approximately 2 to 20 minutes for completion, depending on chromatographic technique. It can be seen that the total test time would be about 30 minutes.

The process is further illustrated by the following example. A sample of soil gas is obtained by driving a gas probe into soil under investigation. A small gas pump is used to pass the gas sample through a column 2 feet long with an internal diameter of 0.2 inch and through a flow recorder to measure the volume of gas exiting the column. The column is packed with "Linde" 5A molecular sieve (alumino silicate having a 5 angstrom pore diameter). The column is packed in Dry Ice during the passage of the sample gas through the column. After 2 minutes, passage of sample gas is discontinued. The Dry Ice packing is removed and a flow of helium carrier gas through the column and detector system is started. The temperature of the column is then raised to 200° C. The heating time is 10 minutes. Helium passing through the column elutes the hydrocarbons separately from the column and the output of the column is detected using a flame ionization detector, with associated electrometer, connected to a standard strip chart recorder. A representative analysis indicates that the gas sample contained about 10 p.p.m. methane, 2 p.p.m. ethane and 1 p.p.m. propane.

It is claimed:

1. A process for detecting hydrocarbons in soil gas comprising passing soil gas through a chromatographic column in the absence of carrier gas, said column being maintained at a temperature sufficiently low to trap substantially all of the hydrocarbon components of the gas in the column, measuring the quantity of gas passed through the column during said trapping, terminating the flow of sample gas to the column when the measured quantity of gas has passed therethrough, passing a carrier gas through the column while heating the column to a temperature sufficient for elution of the trapped hydrocarbons by the carrier gas whereby the components of the trapped hydrocarbon gases are separated, and detecting the eluted hydrocarbons.

2. The process of claim 1 wherein the temperature at which the hydrocarbon gas is trapped is about −40° C. to −200° C.

3. The process of claim 2 wherein the hydrocarbon gas is eluted from the column by raising its temperature to about 180 to 250° C.

References Cited

UNITED STATES PATENTS

| 3,062,039 | 11/1962 | Ayers | 73—23.1 |
| 3,135,108 | 6/1964 | Santeller | 73—23.1 |
| 3,148,532 | 9/1964 | Broerman | 73—23.1 |
| 3,232,093 | 1/1966 | Burow et al. | 73—23.1 |

OTHER REFERENCES

Drew, C. M., et al.: "Some Problems Encountered With the Application of Vapour Phase Chromatography to Kinetic Studies," in Vapour Phase Chromatography, edited by D. H. Desty, Butterworths Scientific Publications, London, 1957, pages 213–220.

Lard, E. W., et al.: "Separation and Determination of Argon, Oxygen, and Nitrogen by Gas Chromatography," in Analytical Chemistry, 32(7), pages 878–879, June 1960.

JAMES J. GILL, *Acting Primary Examiner.*

RICHARD C. QUEISSER, *Examiner.*

J. C. GOLDSTEIN, *Assistant Examiner.*